United States Patent
Guedot et al.

(10) Patent No.: US 11,788,424 B2
(45) Date of Patent: Oct. 17, 2023

(54) SEALING RING FOR A WHEEL OF A TURBOMACHINE TURBINE

(71) Applicant: SAFRAN HELICOPTER ENGINES, Bordes (FR)

(72) Inventors: Thomas Louis Guedot, Moissy-Cramayel (FR); Fabien Hourquet, Moissy-Cramayel (FR); Eloi Duflos, Moissy-Cramayel (FR); Patrice Postel, Artiqueloutan (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/595,755

(22) PCT Filed: May 20, 2020

(86) PCT No.: PCT/FR2020/050841
§ 371 (c)(1),
(2) Date: Nov. 23, 2021

(87) PCT Pub. No.: WO2020/240118
PCT Pub. Date: Dec. 3, 2020

(65) Prior Publication Data
US 2022/0213800 A1    Jul. 7, 2022

(30) Foreign Application Priority Data
May 29, 2019 (FR) ...................................... 1905758

(51) Int. Cl.
*F01D 11/12* (2006.01)
*F01D 11/08* (2006.01)
(Continued)

(52) U.S. Cl.
CPC .............. *F01D 11/12* (2013.01); *F01D 11/08* (2013.01); *F01D 11/14* (2013.01); *F02C 7/28* (2013.01);
(Continued)

(58) Field of Classification Search
CPC .......... F01D 11/14; F01D 11/12; F01D 11/08; F02C 7/28; B33Y 80/00; F05D 2220/323;
(Continued)

(56) References Cited

U.S. PATENT DOCUMENTS 4,187,054 A * 2/1980 Landis, Jr. ................ F01D 5/18
                                                 415/115
4,497,610 A * 2/1985 Richardson ............... F01D 9/04
                                                 415/117
(Continued)

FOREIGN PATENT DOCUMENTS

| EP | 0182716 A1 | 5/1986 |
| GB | 1484288 A | 9/1977 |
| GB | 2125111 A | 2/1984 |

OTHER PUBLICATIONS

International Search Report received for PCT Patent Application No. PCT/FR2020/050841, dated Sep. 3, 2020, 5 pages (2 pages of English Translation and 3 pages of Original Document).
(Continued)

*Primary Examiner* — Igor Kershteyn
(74) *Attorney, Agent, or Firm* — WOMBLE BOND DICKINSON (US) LLP

(57) ABSTRACT

Sealing ring for a wheel of an aircraft turbomachine turbine, the ring having an annular body extending around an axis of revolution and including an outer surface and an inner surface which is coated with an annular layer of an abradable material, the ring further including an annular wall extending around the annular body and at a radial distance from the
(Continued)

body, the annular wall including openings through which cooling air flows by impact on the outer surface, wherein the body and the wall are integrally formed.

9 Claims, 3 Drawing Sheets

(51) Int. Cl.
  *F01D 11/14* (2006.01)
  *F02C 7/28* (2006.01)
(52) U.S. Cl.
  CPC .... *F05D 2220/323* (2013.01); *F05D 2230/31* (2013.01); *F05D 2240/55* (2013.01)
(58) Field of Classification Search
  CPC .............. F05D 2230/31; F05D 2240/11; F05D 2240/55; F05D 2260/20; Y02T 50/60
  See application file for complete search history.

(56) References Cited

U.S. PATENT DOCUMENTS

| | | | | |
|---|---|---|---|---|
| 4,679,981 | A | * | 7/1987 | Guibert .................... F01D 11/08 415/173.1 |
| 5,391,052 | A | * | 2/1995 | Correia .................... F01D 11/10 415/115 |
| 2005/0129499 | A1 | * | 6/2005 | Morris ...................... F01D 9/04 415/1 |
| 2014/0163717 | A1 | * | 6/2014 | Das .......................... C30B 13/28 700/119 |
| 2021/0189905 | A1 | * | 6/2021 | Metge ...................... F01D 25/12 |

OTHER PUBLICATIONS

Written Opinion of the International Searching Authority received for PCT Patent Application No. PCT/FR2020/050841, dated Sep. 3, 2020, 5 pages (4 pages of English Translation and 5 pages of Original Document).

* cited by examiner

[Fig.1]
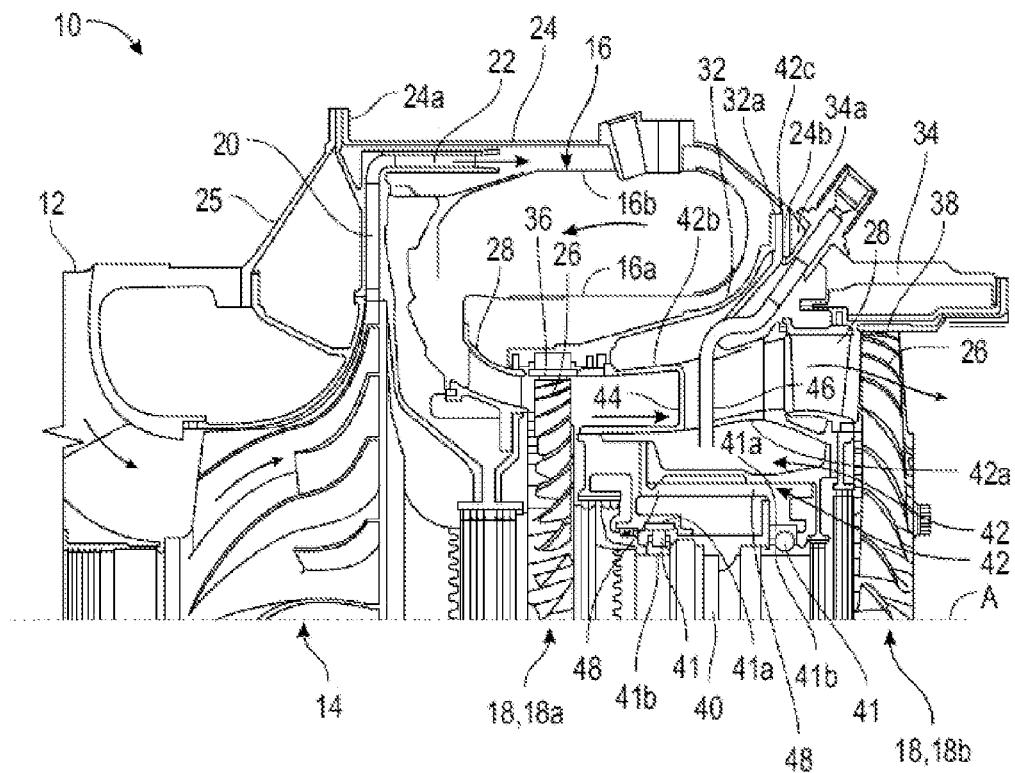
[Fig.2]

[Fig.3]
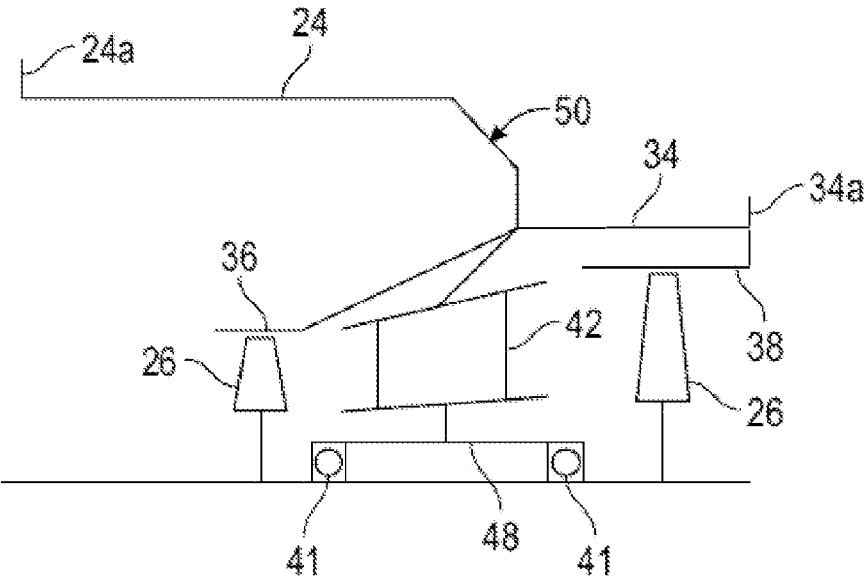
[Fig.4]
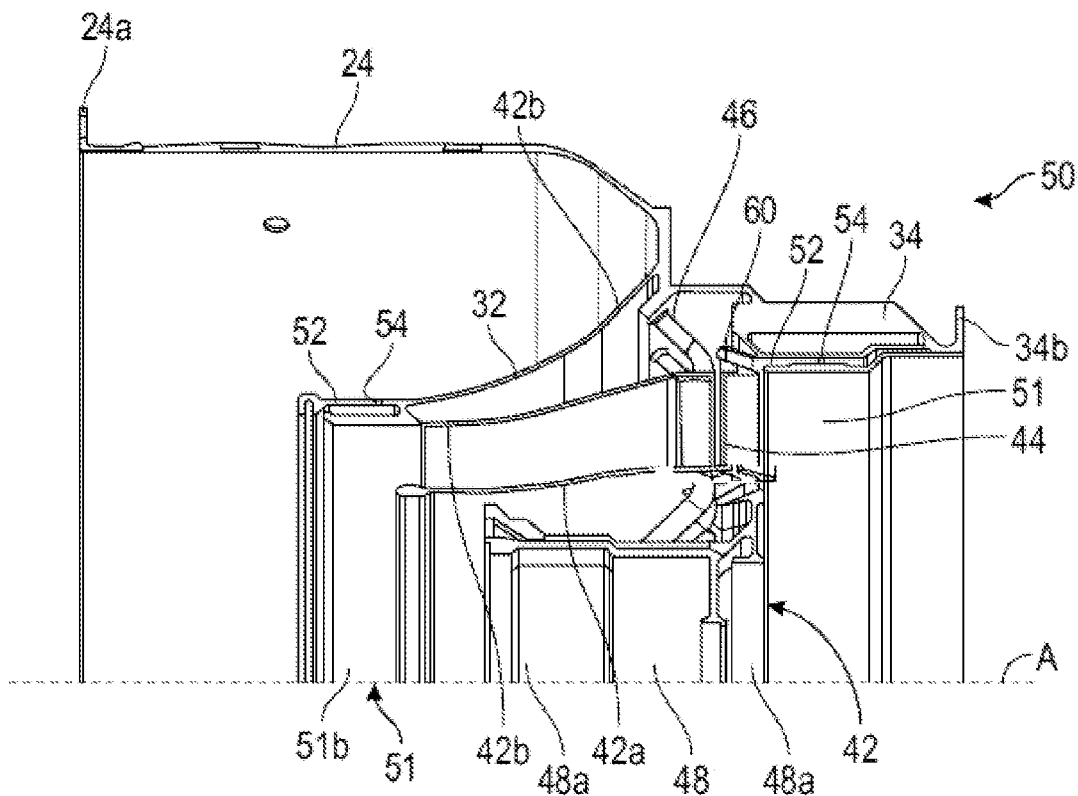

[Fig.5]
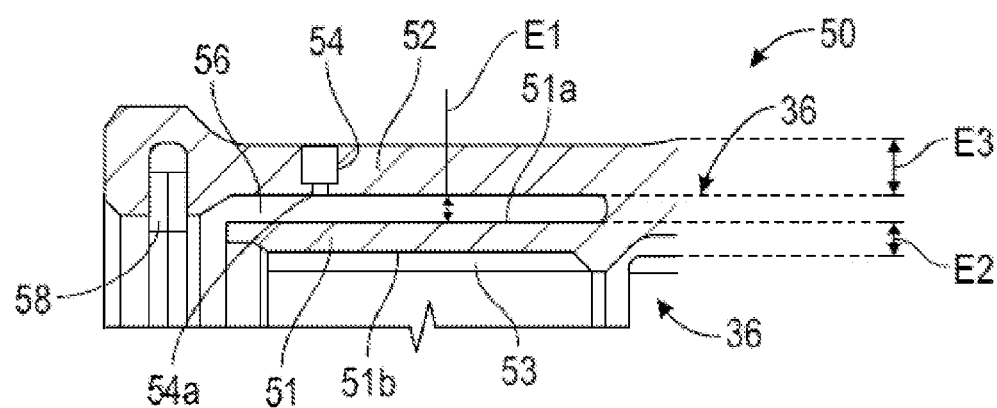

SEALING RING FOR A WHEEL OF A TURBOMACHINE TURBINE

TECHNICAL SCOPE OF THE INVENTION

The present invention relates to a sealing ring for a wheel of a turbomachine turbine.

TECHNICAL BACKGROUND

The technical background comprises, in particular, the documents GB 1 484 288 A and GB 2 125 111 A.

An aircraft turbomachine, for example of an aeroplane or helicopter, comprises an air inlet feeding a gas generator which comprises from upstream to downstream, by reference to the gas flow, at least one compressor, an annular combustion chamber, and at least one turbine.

A turbomachine turbine comprises one or more expansion stages comprising a bladed turbine stator forming a stator, and a bladed wheel forming a rotor. The turbine stator is fastened to a casing and the wheel comprises a disc with blades on its periphery. The wheel rotates within the casing and it is known to provide a sealing ring around this wheel to limit the passage of gas between the tops of the blades and the casing and thus to ensure that as much of the combustion gas leaving the chamber as possible passes through the wheel to optimise the efficiency of the turbomachine.

A sealing ring typically comprises an annular body extending around an axis of revolution and comprising an outer surface and an inner surface which is coated with an annular sealing layer of abradable material on which the tops of the blades can rub in operation.

There are currently two sealing ring technologies. The first technology comprises a one-piece annular body which is fastened by suitable means to a casing. The second technology ring comprises a sectorised annular body, the sectors of the body being fastened independently of each other to the casing.

In both technologies, the ring is surrounded by an annular wall which comprises openings for the passage of air for impact cooling on the outer surface of the body of the ring. This cooling allows for better control of the thermal behaviour of the ring during operation and thus optimises the radial clearances between the body of the ring and the tops of the blades of the wheel during operation.

The first technology is interesting from the point of view of the mass and space optimisation, while the second is interesting from the point of view of the ability to optimise the cooling and therefore the adjustment of the clearances with the tops of the blades, as well as the maintenance and easy replacement of each ring sector.

The present invention provides an improvement to these existing techniques. In particular, it aims to reduce the number of elements for the construction of a turbomachine module, so as to limit the number of fastening systems (screws, bolts, flanges, etc.), the risks of leakage between these elements, the mass of the turbomachine, etc.

SUMMARY OF THE INVENTION

The present invention relates to a sealing ring for a wheel of an aircraft turbomachine turbine, this ring comprising an annular body extending around an axis of revolution and comprising an outer surface and an inner surface which is coated with an annular layer of an abradable material, the ring further comprising an annular wall extending around the annular body and at a radial distance from this body, this annular wall comprising openings for the passage of air for impact cooling on said outer surface, characterized in that the body and the wall are integrally formed.

The production of the body and the wall of the ring in one piece allows to simplify its design and manufacture, this production being preferably carried out by additive manufacturing. It is no longer necessary to provide systems for fastening the body to the wall, which simplifies and lightens the ring.

The ring according to the invention may comprise one or more of the following features, taken alone or in combination with each other:
- the body and the wall define between them an annular space which is closed at a downstream end and open at an upstream end by reference to the flow of gases through the ring in operation.
- said space has a radial thickness less than or equal to that of the body and/or less than or equal to that of the wall.
- said wall comprises at its upstream end an annular groove open radially inwards and in which an annular sealing member is mounted.
- said wall extends downstream to form a radially inner annular casing of a combustion chamber.
- said body extends downstream to form a radially outer annular shroud of an annular bearing support.
- said wall comprises at least one annular row of air passage openings evenly spaced around said axis and oriented in substantially radial directions with respect to this axis.
- each of the air passage openings comprises a constriction at its radially inner end.
- the ring is made of a metal alloy and coated at least in part with a ceramic thermal barrier; the thermal barrier can be constituted by the aforementioned abradable layer; this abradable layer then has a dual function of abradability (improving the rotor/stator behaviour during contacts) and of thermal barrier (controlling the temperature of the ring against the hot gases of the vein).

The present invention also relates to a method of manufacturing a ring as described above, characterised in that the body, the wall and the openings of this wall are obtained by additive manufacturing.

BRIEF DESCRIPTION OF THE FIGURES

Further features and advantages of the invention will become apparent from the following detailed description, for the understanding of which reference is made to the annexed drawings in which:

FIG. 1 is a schematic half-view in axial section of a portion of an aircraft turbomachine, FIG. 2 is a very schematic half-view in axial section of a portion of an aircraft turbomachine, according to the prior art, FIG. 3 is a very schematic half-view in axial section of a portion of an aircraft turbomachine, according to an aspect of the invention, FIG. 4 is a schematic axial sectional half-view of a turbomachine module, according to an aspect of the invention, and FIG. 5 is an enlarged schematic view of a detail of FIG. 4 and shows another aspect of the invention.

DETAILED DESCRIPTION OF THE INVENTION

FIG. 1 shows a part of an aircraft turbomachine 10 such as a helicopter turbojet engine.

The turbomachine 10 comprises from upstream to downstream, with reference to the direction of gas flow (see arrows), an air inlet 12, at least one compressor 14, an annular combustion chamber 16, and at least one turbine 18.

The air entering the engine through the air inlet 12 is compressed in the compressor 14, which is a centrifugal compressor. The compressed air exits radially outwards and feeds the combustion chamber 16 via an annular assembly forming a rectifier 20 and a diffuser 22.

The combustion chamber 16 comprises two annular walls, respectively inner 16a and outer 16b, which extend around each other and which are themselves arranged inside an outer casing 24 of the combustion chamber 16.

This casing 24 comprises at its upstream end an annular flange 24a for fastening to annular flanges of the rectifier-diffuser assembly 20-22 as well as a casing 25 of the compressor 14 and the air inlet 12.

The compressed air is mixed with fuel and burned in the combustion chamber 16, generating combustion gases which are then injected into the turbines 18.

A high-pressure turbine stage 18a is located just downstream of the outlet of the combustion chamber 16 and comprises a stator turbine stator 28 and a rotor wheel 26. A low-pressure turbine stage 18b is located downstream of the stage 18a and also comprises a turbine stator 30 and a rotor wheel 26.

A turbine stator comprises an annular row of fixed straightening blades of the gas stream, and a turbine wheel comprises an annular row of blades carried by a rotor disc.

The casing 24 further comprises at its downstream end an annular flange 24b for fastening to sealing ring support flanges 36, 38.

A casing 32 extends within the wall 16a and carries at its upstream end the sealing ring 36 which extends around the wheel 26 of the stage 18a, and at its downstream end a flange 32a for fastening to the flange 24b. A ring gear 34 carries the sealing ring 38 which extends around the wheel 26 of the stage 18b. This ring gear 34 comprises a flange 34a for fastening to the flanges 32a, 24b.

Each sealing ring 36, 38 comprises an inner cylindrical surface which is coated with an abradable annular layer configured to wear by friction with the tops of the blades of the wheel 26 to minimise the gas leakage in that area as much as possible. This abradable layer advantageously has a thermal barrier function. Alternatively, the rings could not comprise such a layer or only one of the rings 36, 38 (e.g. the ring 36) could comprise such a layer.

The wheels 26 are connected to each other by a shaft 40 which is further connected to the impeller of the centrifugal compressor 14. The shaft 40 is guided in rotation by rolling bearings 41 which are carried by an annular support 42 interposed between the two stages 18a, 18b.

The bearing support 42 comprises two annular shrouds, respectively inner 42a and outer 42b, connected together by an annular row of arms 44 extending substantially radially with respect to the axis A of rotation of the shaft 34. The arms 44 are tubular and may be used for the passage of easements 46 such as fluid lines or electrical cables.

The bearing support 42 is mounted inside the casing 32 and carries a bearing housing which comprises a ring gear 48 for supporting the outer rings 41a of the bearings 41. The bearings 41 are here two in number, an upstream roller bearing and a ball bearing, the inner rings 41b of which are mounted directly on the shaft 34.

FIG. 2 shows very schematically the current state of the art in manufacturing and assembling of several elements visible in FIG. 1.

Firstly, the sealing rings 36, 38 are made independently of each other and of the other surrounding pieces. They are fastened by flanges or hooks to the casings 32, 34 which are themselves fastened by flanges to the outer casing 24 of the chamber. The bearing support 42 is also fastened by a flange 42c to this casing 24.

FIG. 3 illustrates an aspect of the invention which consists in providing a module 50 which is one-piece, i.e. integrally formed, preferably by additive manufacturing, and including several of the aforementioned elements.

In the example shown, the module 50 comprises the casing 24, the sealing rings 36, 38 and at least a portion of the bearing support 42.

FIG. 4 represents a more concrete embodiment of this module 50 and FIG. 5 is a detail view of FIG. 4 and more specifically illustrates another aspect of the invention relating to the sealing rings 36, 38.

Each sealing ring 36, 38 advantageously comprises an annular body 51 extending around the axis A and comprising an outer surface 51a and an inner surface 51b which is coated with an annular layer 53 of an abradable material.

The ring 36, 38 further comprises an annular wall 52 extending around and radially spaced from the annular body 51. This annular wall 52 comprises openings 54 for the passage of air for impact cooling on the outer surface 51a. As can be clearly seen in FIG. 5, the body 51 and the wall 52 are integrally formed and these elements and the openings 54 are advantageously obtained by additive manufacturing.

The body 51 and the wall 52 define between them an annular space 56 which is closed at a downstream end and open at an upstream end. This space 56 has a radial thickness E1 less than or equal to that of E2 of the body 51 and/or less than or equal to that of E3 of the wall 52.

The following description applies more specifically to the ring 36 illustrated in FIG. 5.

The wall 52 comprises at its upstream end an annular groove which is open radially inwards and in which an annular sealing member 58 for the upstream stage 18a referred to above is mounted.

The wall 52 extends downstream and is connected to or forms the radially inner annular casing 32 of the combustion chamber 16.

The body 51 extends downstream and is connected to or forms the outer shroud 42b of the bearing support 42.

The wall 52 comprises at least one annular row of air passage openings 54 evenly spaced around the axis A and oriented in directions substantially radial with respect to that axis. Each of these openings 54 comprises a constriction 54a at its radially inner end to accelerate the stream of air flowing through the opening and improve the cooling by impact of the body 51 of the ring 36.

The rings 36, 38 and the assembly of the module 50 may be made of a metal alloy. The layers 53 are advantageously made of ceramic.

Another aspect of the invention relates to a method for manufacturing a ring 36, 38 as well as the module 50 by additive manufacturing.

In the embodiment of the module shown in FIG. 4, the latter comprises:

the two inner 32 and outer 24 casings,
the two sealing rings 36, 38, and
the bearing support 42.

The outer casing 24 comprises at its upstream end the annular flange 24a for fastening the module, for example to the aforementioned flanges of the casing 24 and of the diffuser-rectifier assembly 20-22 of FIG. 2.

As mentioned above, the upstream ring 36, and, in particular, its annular wall 52, is connected to the inner casing 32.

The outer shroud 42b of the bearing support 42 extends between the rings 36, 38 and is connected to the downstream ring 38 by an elastically deformable annular portion 60. This portion 60 is relatively flexible and is capable of elastic deformation in the axial and/or radial direction to allow for differential thermal expansions during operation in particular. This portion 60, also known as a pin, can be used to support the outer shroud 42b which is then not supported by the arms but by this flexible portion. The inner shroud 42a can be supported in the same way by means of another flexible portion.

The inner shroud 42a of the bearing support 42 extends around the inner ring gear 48 and is connected to this inner ring gear which comprises cylindrical surfaces 48d for mounting the outer rings 41a of the bearings 41.

The downstream ring 38 is connected by an outer ring gear 34 to a junction zone between the casings 24, 32. This ring gear 34 comprises at its downstream end the annular flange 34b for fastening the module 50.

The one-piece construction of each ring 36, 38 allows to simplify its design and manufacture and to integrate all the functions of a ring of the previous technique, including those of retention of the blades in the event of breakage, aerothermal function, etc.

The ring is cooled by the impact of the air flowing through the openings 54 of the wall 52 during operation. The shape of these openings 54 and the distance between them and the body 51 (radial thickness E1) are determined to optimise the cooling of the ring and therefore the performance.

The one-piece module 50 can significantly reduce its mass (in the order of 25 to 30% in the example shown) compared to the previous technique.

Additive manufacturing allows these manufacturing and optimisation objectives to be achieved.

The invention claimed is:

1. A sealing ring for a wheel of an aircraft turbomachine turbine, this ring comprising an annular body extending around an axis of revolution and comprising an outer surface and an inner surface which is coated with an annular layer of an abradable material, the ring further comprising an annular wall extending around the annular body and at a radial distance from this body, this annular wall comprising openings for passage of air for impact cooling on said outer surface, wherein the body and the wall are integrally formed, and wherein the body and the wall define between them an annular space which is closed at a downstream end and open at an upstream end by reference to the flow of gases through the ring in operation.

2. The ring according to claim 1, wherein said space has a radial thickness (E1) less than or equal to that (E2) of the body and/or less than or equal to that (E3) of the wall.

3. The ring according to claim 1, wherein said wall comprises at its upstream end an annular groove open radially inwards and in which an annular sealing member is mounted.

4. The ring according to claim 1, wherein said wall extends downstream to form a radially inner annular casing of a combustion chamber.

5. The ring according to claim 1, wherein said body extends downstream to form a radially outer annular shroud of an annular bearing support.

6. The ring according to claim 1, wherein said wall comprises at least one annular row of air passage openings, evenly spaced around said axis and oriented in substantially radial directions with respect to that axis.

7. The ring according to claim 1, wherein each of the air passage openings comprises a constriction at its radially inner end.

8. The ring according to claim 1, wherein it is made of metal alloy and coated at least in part with a ceramic thermal barrier.

9. A method of manufacturing a ring according to claim 1, wherein the body, the wall and the openings of this wall are obtained by additive manufacturing.

* * * * *